United States Patent [19]

Neuerburg et al.

[11] Patent Number: 4,809,488
[45] Date of Patent: Mar. 7, 1989

[54] MOWER WITH ROTATING DRUMS FORMED FROM SPACED STANDARDS

[75] Inventors: Horst Neuerburg; Jean-Marc Jürgens, both of Saverne, France

[73] Assignee: Kuhn, S.A., Saverne, France

[21] Appl. No.: 45,317

[22] Filed: May 4, 1987

[30] Foreign Application Priority Data

May 2, 1986 [FR] France ............................... 86 06496

[51] Int. Cl.⁴ ............................................. A01D 34/66
[52] U.S. Cl. ....................................... 56/13.6; 56/192; 56/255
[58] Field of Search ................... 56/6, 13.6, 192, 255, 56/DIG. 21

[56] References Cited

U.S. PATENT DOCUMENTS 4,693,062 9/1987 van der Lely et al. ............ 56/13.6

FOREIGN PATENT DOCUMENTS

1366072 9/1974 United Kingdom ................. 56/13.6

Primary Examiner—Stephen F. Husar
Attorney, Agent, or Firm—Oblon, Fisher, Spivak, McClelland & Maier

[57] ABSTRACT

A mower including a frame supporting, by means of connecting members, one or more rotary cutting elements equipped with cutting tools and surmounted by a rotary drum which is equipped with a casing. At least a part of the connecting members penetrate into the rotary drum. A device for drive the cutting element and the rotary drum includes a shaft and a hub connected in rotation to the shaft. The cutting element and the rotary drum are fastened to the hub, and the shaft and the hub extend partly at least into the rotary drum. The part of the connecting members penetrating into the rotary drum is connected to the shaft of the cutting element. The casing of the the rotary drum is formed by standards separated from one another by spaces and connected together at their lower part by a lower connecting element and at their upper part by an upper connecting element.

66 Claims, 3 Drawing Sheets

MOWER WITH ROTATING DRUMS FORMED FROM SPACED STANDARDS

FIELD OF THE INVENTION

This invention relates to a mower comprising a frame supporting, by means of connecting members, one or more rotary cutting elements equipped with cutting tools and surmounted by a rotating drum which is equipped with a casing. At least a part of the connecting members penetrate into the rotating drum. A device for driving the cutting element and the drum comprises a shaft and a hub connected in rotation to the shaft. The cutting element and the rotating drum are fastened to the hub, and the shaft and the hub extending at least partly into the drum. The part of the connecting members penetrating into the drum is connected to the shaft of the cutting element.

BACKGROUND OF THE INVENTION

Such a mower is known which comprises a plurality of cutting elements guided in rotation on the upper face of a housing. The cutting element located at each end of the housing is surmounted by a rotating drum of a certain volume. The drive device of the cutting elements and the rotating drums, and a part of the connecting members that connect the cutting elements to the frame, penetrate into the inboard drum by going through its upper part. The other part of the connecting members penetrates into the second drum, also by going through its upper part. The drums of this known mower are made by forming and extend freely upwardly from their corresponding cutting element, to which they are fastened by welding. Considering the production tolerances necessary during the forming of the casing of the drums, considering the deformations and/or poor placements of the drums in relation to their corresponding cutting element during welding, and considering the deformations to which the drums can be subjected by an impact during work, it can happen that the upper part of the drums is widely off-center in relation to the connecting members.

Since the connecting members are stationary and the drums inside of which at least a part of these connecting members penetrate are rotating, it has been necessary to provide a certain space between the connecting members and the upper part of the drums to prevent, in any case, the upper part of the drums from coming in contact with the part of the connecting members penetrating inside the drums.

When the known mower is working, the two drums surmounting the outer cutting elements prevent the hooking of cut hay on the drive device and/or on the connecting members. Additionally, the two drums windrow the cut hay to reduce the width of the windrow left by the mower. The hay which is moved by the drums rises along the drums and a part of it penetrates inside the drums through the space made between the connecting members and the upper part of the drums. Moreover, inside the drums are also hayseeds and dust.

Under the effect of the very high speed of the drums, this plant debris and this dust finally accumulate on the inside walls of the drums to form a very compact and relatively heavy mass which causes very significant unbalances. These unbalances substantially increase the load on the bearings which guide in rotation the cutting elements that surmount the drums and thereby substantially reduces the life of these bearings.

In addition, this accumulation of plant debris and earth dust forms a very abrasive mass which quickly wears the connecting members.

These phenomena are more significant the larger the volume of the drums.

It has therefore been sought by various means to prevent the plant debris and dust from being able to enter into the drums.

Of course, these means have brought improvements. Nevertheless, working conditions (particularly very dry soils) have been encountered where there has always been noted a filling of the drums with dust at the end of a certain work period.

On a known mower the solution has even been abandoned of connecting members going through the upper part of the outside drum, which is the most exposed part, to have a completely closed outside drum. In this known modified mower, the outside end of the housing is now connected to the frame by a connecting member in the form of an arm which extends behind the drum of the outside cutting element. However, this solution has drawbacks under certain hay conditions, where the cut hay can remain hooked to the connecting arm and cause crammings.

Another mower is known the cutting elements of which are formed by cage-shaped drums to reduce the angular momentum of the drums. However, the drums of this known mower are not penetrated by connecting members connecting the cutting element to the frame of the machine. In addition, there is not drive device for the cutting element and the drum extending at least partly into the drum.

OBJECT OF THE INVENTION

The object of this invention is to solve or, at least, ameliorate the problem of filling with plant debris and dust of mower drums that surmount the cutting elements and which are penetrated by connecting members connecting the cutting elements to a frame.

SUMMARY OF THE INVENTION

For this purpose, the mower according to the invention is characterized by the fact that the casing of the rotary drum is formed by standards separated from one another by spaces and connected together at their lower part by a lower connecting element and at their upper part by an upper connecting element.

Thanks to this arrangement, the drums surmounting the cutting elements of a mower the upper parts of which are penetrated by connecting members connecting the cutting elements to a frame are no longer able to be filled with plant debris and dust which could accumulate to form a very compact, relatively heavy, and very abrasive mass.

While in the mowers of the prior art an effort was made to make the drum as tight as possible to prevent plant debris and dust from penetrating into the drum, in the mower according to the invention plant debris and dust are allowed to penetrate into the drum. However, the plant debris and dust are also allowed to leave the drum under the effect of centrifugal force. Thus, the plant debris and dust no longer are able to form a large, compact, heavy, and abrasive mass causing great unbalances and wearing the connecting members which extend into the drum.

The life of the bearings that guide in rotation the cutting elements which are surmounted by the drums, and the life of the connecting members penetrating into the drums and connecting the cutting elements to the frame, are thus substantially increased.

Moreover, if the blades of cut hay from time to time should remain hooked in the drum, the user of the machine will have no difficulty in getting these blades out, since he has easy access to the inside of the drum.

According to an additional characteristic of the invention, the width of the spaces made between the standards is at least approximately equal to the width of the standards. The exit of the plant debris and dust which have come to penetrate into the drum is thus facilitated.

According to another additional characteristic of the invention, the inside face of the standards consists of a convex surface the center of the circumscribed circle of which is located outside the volume of the drum.

Advantageously, the inside face of the standards is a curved surface. Adherence of the plant debris and dust which have penetrated into the drum to the inside face of the standards is almost nonexistent. Such an inside face, considering the high speed of rotation of the drums, is approximately self-cleaning.

According to another additional characteristic of the invention, at least one of the connecting elements is constituted by the hub connected in rotation to the shaft of the cutting element and of the drum which surmounts the latter, and on which the cutting element and the corresponding drum are fastened.

Advantageously, the lower connecting element is constituted by the hub. Thanks to this characteristic, it is also possible to have a drum the upper connecting element of which is at least approximately rigorously concentric with the hub. Accordingly, the bore of the upper connecting element through which the connecting members penetrate into the drum and the bore of the hub can be machined precisely. Also, the part of the connecting members extending in the vicinity of the upper connecting element can also be machined at least approximately concentrically with the bearing by means of which the shaft of the cutting element is connected to the connecting members. Moreover, the upper part of the drum is very rigid and therefore practically does not deform under the effect of impacts which can appear during work. These precise machinings and this rigidity thus make it possible to reduce the space between the upper connecting element and the part of the connecting members extending in the vicinity of the upper connecting element. This creates a good baffle between these various members and this element. This thus reduces the danger of windings of cut hay blades around the connecting members in the vicinity of the upper connecting element.

According to another additional characteristic of the invention, the front edge of the standards, considering the direction of rotation of the drum, is provided with a removable protective piece.

Advantageously, this protective piece surrounds the front edge of the standards.

This characteristic makes it possible to protect the front edge of the standards, which is the most stressed spot of the standards. This removable protective piece thus makes it possible to have a leading edge of the standards that is always suitable by simply changing the protective piece if it is worn or damaged, without having to dismantle the drum.

According to another additional characteristic, at least a part of the standards is provided with removable hay drivers.

The drums thus have increased driving power. The removability of the drivers makes is possible to change them when they are worn or damaged or to remove them when conditions require it.

According to another characteristic of the invention, the cutting element consists of at least two segments which are removably fastened to the lower connecting element. Thanks to this characteristic, the cutting element surmounted by a drum can be changed without it being necessary to dismantle the drum, the hub, and the housing of the mower.

DETAILED DESCRIPTION OF THE PRESENTLY PREFERRED EMBODIMENTS

The First Embodiment

Figure 1:
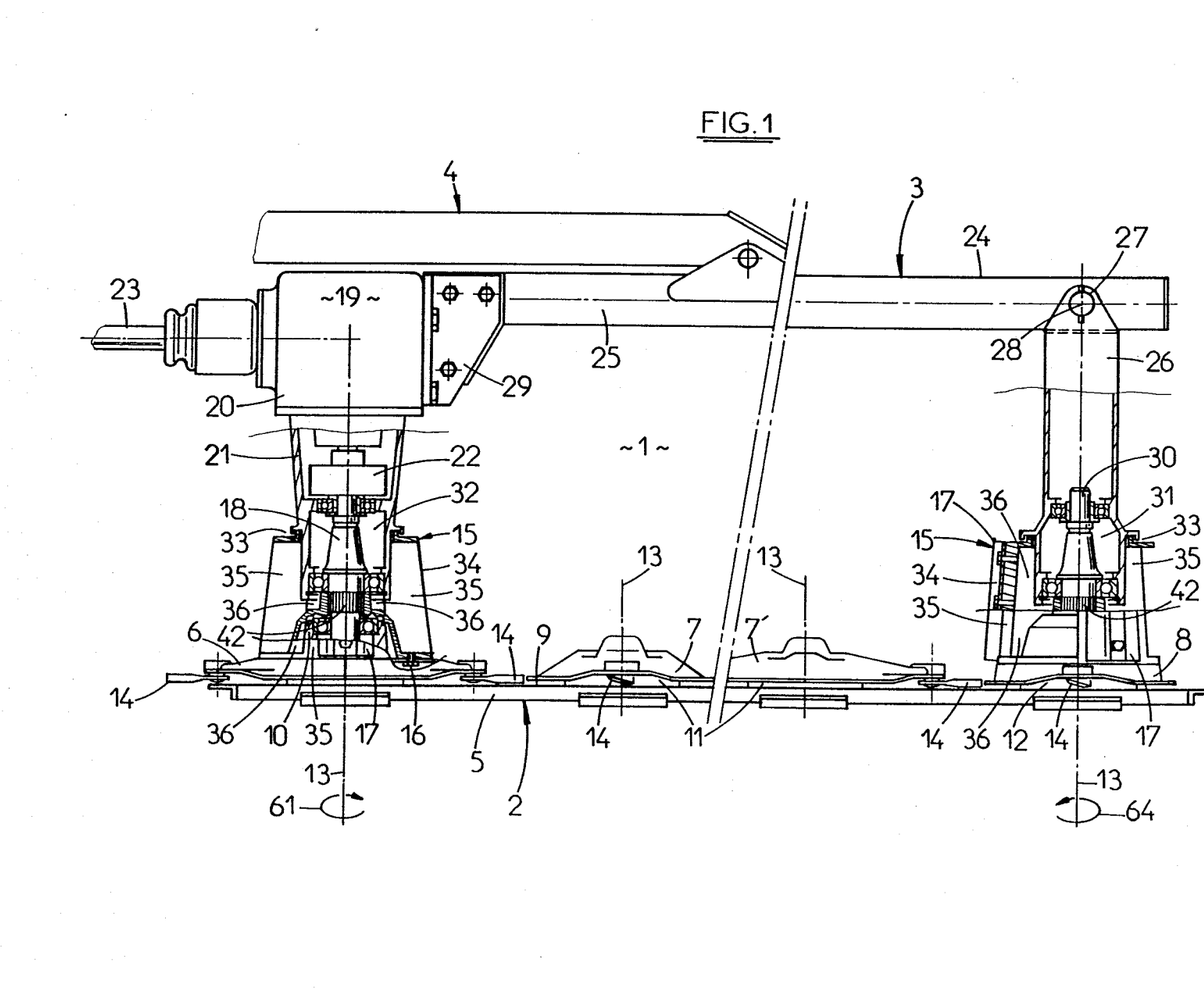
FIG. 1 is a partial back view in the direction of work partially in section of a mower according to the invention.

A mower 1 depicted in FIG. 1 comprises a cutting bar 2 which is connected with the help of connecting members 3 to a frame 4.

The cutting bar 2 is made up of a housing 5 which supports a certain number of cutting elements 6, 7, 7', and 8. The cutting elements 6, 7, 7', and 8 extend to the upper face 9 of the housing 5. Each cutting element 6, 7, 7', and 8 is guided in rotation in a roller bearing 10, 11, or 12 fastened to the upper face 9 of the housing 5. The cutting element 6, 7, 7', and 8 revolve around axes of rotation 13 directed upwardly and preferably at least approximately vertically.

Each cutting element 6, 7, 7', and 8 is provided with a certain number of cutting tools 14. The two end cutting elements 6 and 8 are each surmounted by a drum 15. Each cutting element 6 and 8 is fastened to its respective drum 15 by means of bolts 16. The drums 15 thus revolve with their respective cutting element 6 and 8 and serve to reduce the width of the cut hay windrow placed behind the cutting bar 2. For this purpose, the drums 15 are provided with drivers 17 and/or 171.

Driving of the cutting elements 6, 7, 7', and 8 is produced by drive elements (not shown) housed in a way known to a person of ordinary skill in the art inside the housing 5 of the cutting bar 2. Driving of the drive elements in rotation is achieved by a shaft 18 in the inboard cutting element 6. For this purpose, the shaft 18 is extended upwardly and penetrates into a transmission device 19 comprising a housing 20 and a barrel 21 extending downwardly from the housing 20 in the direction of inboard cutting element 6. The shaft 18 thus goes through the upper part of the drum 15 surmounting the inboard cutting element 6. The housing 20 contains, in a way known to a person of ordinary skill in the art, transmission elements which are coupled to the upper end of the shaft 18 of the inboard cutting element 6 by means of a flexible coupling 22. The transmission elements housed on the inside of the transmission device 19 are themselves driven in rotation by a universal joint shaft 23 coupled, in a way known to a person of ordinary skill in the art, to the power takeoff of a tractor vehicle (not shown) to which the mower 1 is coupled during work.

At a certain distance above the housing 5 of the cutting bar 2 a support structure 24 extends which is one of the connecting members 3. The support structure 24 is made up of a beam 25 and a strut 26. The beam 25 extends at least approximately parallel to the housing 5, while the strut 26 extends downwardly in the direction of the outboard cutting element 8. The beam 25 and the strut 26 thus extend at least approximately in the plane containing the axes of rotation 13 of the cutting elements 6, 7, 7', and 8.

The connection between the beam 25 and the strut 26 is achieved by means of a cylindrical joint 27 the axis 28 of which is at least approximately perpendicular to the plane containing the axes of rotation 13 of the cutting elements 6, 7, 7', and 8.

The end of the beam 25 away from the strut 26 is fastened to the housing 20 by means of a fastening device 29.

The barrel 21, the housing 20, the beam 25, and the strut 26 thus constitute the connecting members 3 that connect the cutting bar 2 to the frame 4 of the mower 1.

Connection of the cutting bar 2 to the connecting members 3 is performed by means of the shaft 18 of the inboard cutting element 6 and a shaft 30 in the outboard cutting element 8. For this purpose, the shaft 30 of the outboard cutting element 8 is extended upwardly and penetrates into the strut 26. The shaft 30 thus partly extends into the drum 15 surmounting the outboard cutting element 8 and goes through the upper part of the drum 15. Connection between the strut 26 and the upper part of the shaft 30 is achieved by means of a bearing 31 which, on the one hand, guides in rotation the upper part of the shaft 30 of the outboard cutting element 8 in the strut 26 and which, on the other hand, axially connects the upper part of the shaft 30 to the strut 26. The shaft 18 of the inboard cutting element 6 is similarly connected to the barrel 21 of the transmission device 19 by means of a bearing 32 which, on the one hand, guides in rotation the shaft 18 in the barrel 21 and which, on the other hand, axially connects the shaft 18 to the barrel 21.

In FIG. 1, only a part of the frame 4 has been shown. That part is connected at one of its ends to the connecting members 3. At its other end the frame 4 comprises a structure (not shown but within the scope of a person of ordinary skill in the art) making it possible to connect the frame 4 to the hitch of the tractor vehicle (not shown) to which the mower 1 is coupled.

In FIG. 1 it is also seen that the drum 15 surmounting the inboard cutting element 6 and the drum 15 surmounting the outboard cutting element 8 each form a baffle 33 with the barrel 21 and the strut 26, respectively, which goes through the upper part of the associated drum 15 and penetrate into the associated drums 15. Moreover, the drums 15 according to the invention have a particular structure. In particular, each drum 15 has a casing 34 formed by standards 35 separated from one another by spaces 36.

The structure of the drums 15 will now be described below with the reference to two embodiments shown in FIGS. 2 to 6. Drum 15 of these two embodiments have a structure very similar to one another, so that approximately identical elements will be designated by the same reference numbers. Moreover, for a good understanding of FIGS. 3 and 5 and to make possible a correct description of the various elements, a bare standard, a standard with its mounted driver seen from the outside, and a standard with its mounted driver seen in section have been shown.

As stated above, each of the drums 15 surmounting one of the cutting elements 6 and 8 comprises a casing 34 which is formed by a plurality of standards 35 separated from one another by spaces 36. In the embodiments shown, the number of standards is three. However, within the context of the invention, this number can be different from there. Although not essential, preferably the width of the spaces 36 separating the standards 35 is at least approxiamtely equal to the width of the standards 35.

The standards 35 are connected together at their upper part by an upper connecting element 37 and at their lower part by a lower connecting element 38. In the examples shown, the lower connection element 38 consists of a hub 39 which extends at least partly into the drum 15 and by means of which the drum 15 and the corresponding cutting element 6 or 8 are connected to the corresponding shaft 18 or 30. This connection particularly comprises a connection in rotation so that each of the shafts 18 and 30 can drive in rotation the associated cutting element 6 or 8 and the associated drum 15. For this purpose, a bore 40 in the hub 39 of the drums 15 is provided with splines 41 which engage splines 42 (see FIG. 4) made on the corresponding shafts 18 or 30.

The lower connecting element 38 (i.e., the hub 39), the standards 35, and the upper connecting element 37 thus form a single piece which can, for example, be made by molding. The advantage of this embodiment resides in the face that a part 43 of the upper connecting element 37 extending in the vicinity of the barrel 21 or the strut 26 (shown partially in dot-anddash lines in FIG. 4) which go through the upper part of the drums 15 can be machined very precisely so that the play between the part 43 of the upper connecting element 37 and the barrel 21 or the strut 26 can be as small as possible. The part 43 of the upper connecting element 37 can thus form the baffle 33 with the barrel 21 or the strut 26. For this purpose, the barrel 21 and the strut 26 comprise a machined setback 44 into which the part 43 of the upper connecting element 37 partially penetrates. Thus, the dangers of wingings of cut hay blades are reduced.

The corresponding cutting elements 6 or 8 is fastened to the lower face 45 of the lower connecting element 38. Each cutting element 6 or 8 is formed by two segments 46, 47. Each segment 4,6 47 is fastened to the lower face 45 of the lower connecting element 38 by means of the bolts 16, which are screwed into tapped holes 48 made in the lower connecting element 38. Thanks to this arrangement, the segments 46, 47 of the cutting elements 6, 8 can easily be replaced when they are worn or damaged without it being necessary to dismantle the cutting bar 2 or the drums 15.

Figure 3:
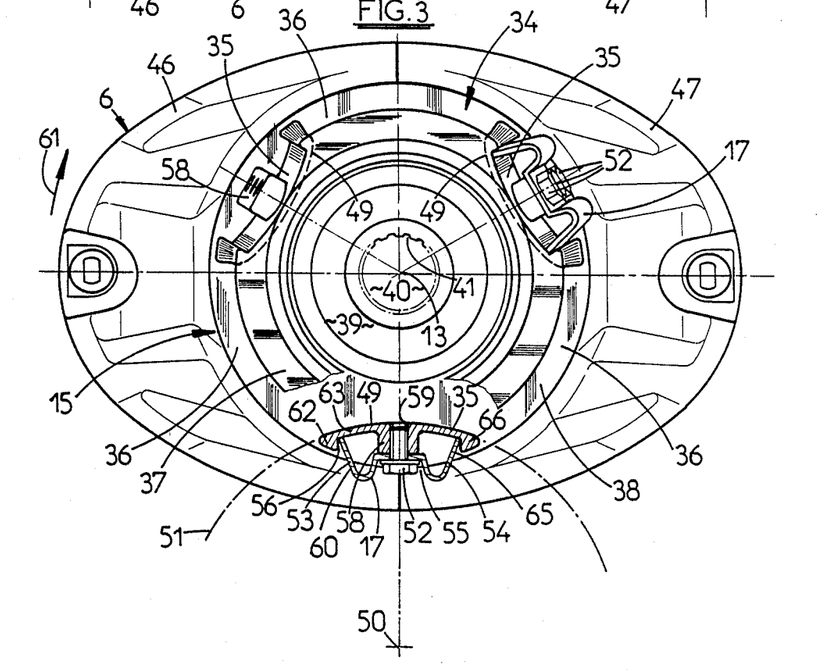
FIG. 3 is a top view, partially in section along plane III—III in FIG. 2, of the cutting element and drum of FIG. 2.
Figure 5:
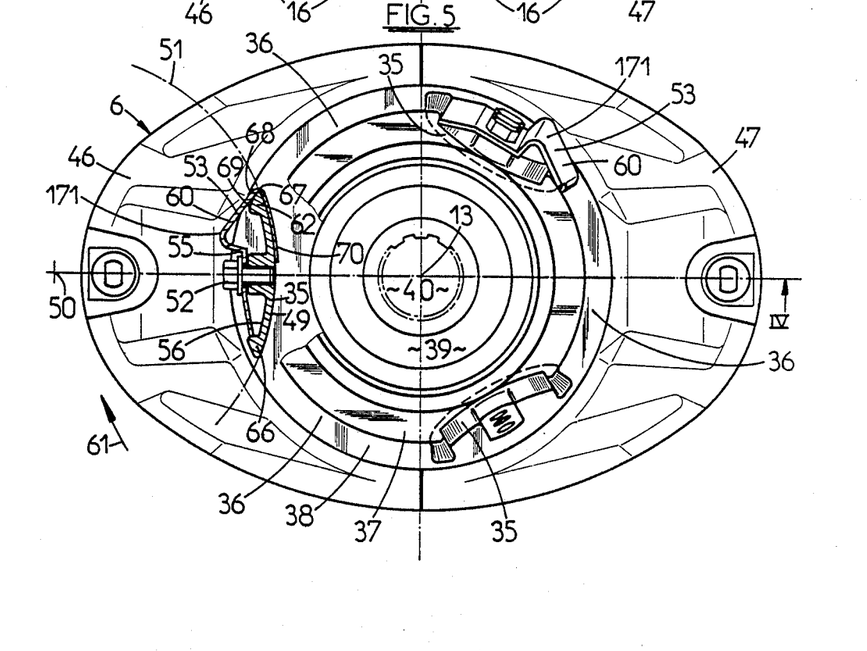
FIG. 5 is a top view, partially in section along plane V—V of FIG. 4, of the cutting element and drum of FIG. 4.

The shape of the standards 35 and more especially their cross sections clearly appear in FIGS. 3 and 5. In those figures, it is seen that the inside face 49 of standards 35 consist of a convex surface. The center 50 is circumscribed circle 51 is located outside the volume of the drum 15. Preferably, the inside face 49 is a curved surface. Thanks to this arrangement, the plant debris and dust that have penetrated into the drum 15 through the spaces 36 separating the standards 35 cannot adhere significantly to the inside face 49 of the standards 35.

As stated above, the standards 35 are provided with drivers 17 or 171.

Figure 2:
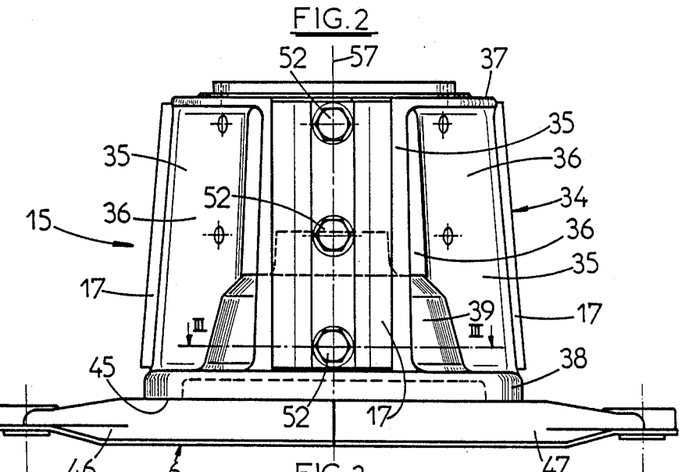
FIG. 2 is a front view of the first cutting element of the mower of FIG. 1, surmounted by its drum.

A first embodiment of these drivers is shown in FIGS. 2 and 3. As can be seen therein, the drivers 17 are fastened to their corresponding standards 35 by means of bolts 52 so that they can be replaced when they are worn or damaged, or removed when work conditions require it.

In cross section, it can be seen that each driver 17 comprise a general W shape, having two outside wings 53 and 54 connected together by a setback 55. The open part of the W is housed in a groove 56 in the outside face 69 of the associated standard 35. The groove 56 extends at least approximately parallel to longitudinal axis 57 of the standard 35. In this setback 55 connecting the two outside wings 53 and 54 of the driver 17 are housed the heads of the bolt 52 which connect the driver 17 to the standard 35, which for this purpose comprises a boss 58 on which the setback 55 rests and which comprises tapped holes 59 into which the bolts 52 are screwed. Thanks to this setback 55, the heads of the bolts 52 are thus effectively protected by the outside wings 53, 54 from wear and/or impacts.

Moreover, the fact that the free ends of the outside wings 53 and 54 of the driver 17 are housed in the groove 56 of the standard 35 makes it possible to keep the ends of the outside wings 53 and 54 from being hooked to an obstacle, which could cause the deformation of the outside wings 53 and 54.

To be able to perform correctly their function of driving the cut hay, the front face 60 of the front outside wing 53 of the drivers 17 is directed toward the back, considering the direction of rotation 61 of the first cutting element 6 and its corresponding drum 15.

Further, to give the drums 15 a suitable life, the front edge 62 of the standards 35 is thicker than the central part 63 of the standards. This gives the front edge 62 a good resistance to the impacts to which it is subjected during work.

Figure 4:
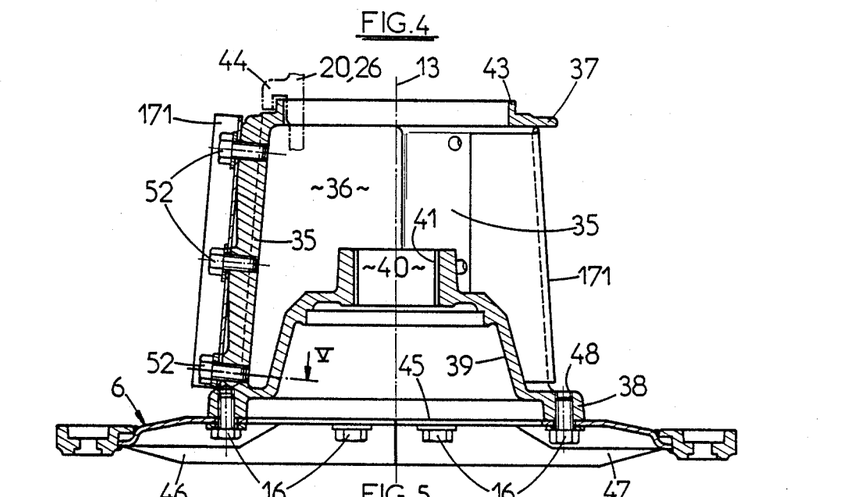
FIG. 4 is a front view in section along plane IV—IV in FIG. 5 of a variant embodiment of the drum of the first cutting element of the mower of FIG. 1.

In FIG. 3 can be seen in addition that each standard 35 and its driver 17 are at least approximately symmetrical in relation to the plane containing the axis of rotation 13 of the drum 15 and the longitudinal axis 57 of the standard 35. In this way, the drum 15 can either surmount the inboard cutting element 6 which rotates in the direction 61 or the outboard cutting element 8 which rotates in the opposite direction 64. With this arrangement, a face 65 of the outside wing 54 is also directed backward, considering the direction of rotation 64 of the drum 15, when the latter surmounts the outboard cutting element 8. Likewise, an edge 66 of the standards 35 is also thicker than the central part 63 and therefore can also resist impacts well. The Second Embodiment A second embodiment of the drivers is shown in FIGS. 4 and 5. In this embodiment, the drum 15 is identical with the one described above, except in regard to the drivers 171—which even so comprise parts identical with certain parts of the drivers 17. Thus, the drivers 171 are also fastened to their corresponding standard 35 by means of bolts 52 screwed into tapped holes 59 made in the boss 58 of the standard 35. Likewise, the drivers 171 also comprise a setback 55 in which are housed the heads of the bolts 52. The heads of the bolts 52 therefore are also effectively protected from wear or impacts. Finally, the drivers 171 also comprise a front outside wing 53 the front face 60 of which is directed toward the back, considering the direction of rotation 61 of the cutting element 6 surmounted by the drum 15.

In FIG. 5 it can be seen that front edge 62 of the standards 35 is provided with a protective piece 67. The function of the protective piece 67 is to avoid wear of the front edge 62 of the standards 35. To do this, the protective piece 67 surrounds the front edge 62 and even covers a part of the inside face 49 of the standard 35. For this purpose, the protective piece 67 comprises an outside wing 68 which covers at least the part of the outside face 69 of the standard 35 located in the vicinity of the front edge 62, and an inside wing 70 which covers at least the part of the inside face 49 of the standard 35 located in the vicinity of the front edge 62. The inside wing 70 at least approximately assumes the shape of the inside face 49.

In the example above, the protective piece 67 and the driver 171 form a single piece. For this reason, the protective piece 67 is also fastened to the standard 35 by means of the bolts 52 so that it can be replaced in case of wear. In the invention, it is also possible to have separate drivers 171 and protective pieces 67 mounted on the same standard 35, or even to have the standards 35 solely equipped with the protective pieces 67. However, in any case, the protective pieces 67 will be mounted on the associated standard 35 so as to be removable.

FIGS. 4 and 5 show the inboard cutting element 6 which rotates in the direction 61. In the case of the outboard cutting element 8, which rotates in the opposite direction 64, the driver 171 and the protective piece 67 will be different from those of the first cutting element 6. THat is, the driver 171 will have a front face which will extend from the side of the edge 66 of the standards 35, and the protective piece 67 will cover the edge 66.

It is also seen in FIGS. 2 and 4 that the drivers 17 and 171 and the protective pieces 67 extend at least approximately over the entire height of the drums 15.

While in the examples shown each standard 35 is provided with a driver 17 or 171, it will be possible within the context of the invention to have only a part of the standards 35 be covered with the drivers 17 or 171.

Various modifications can be made to the embodiment described without thereby going outside the scope of the invention as defined in the claims which follow.

What is claimed as new and desired to be secured by Letters Patent of the United States is:

1. A mower comprising
   (a) a frame supporting, by means of connecting members, at least one rotary cutting element provided with cutting tools and surmounted by a rotary drum which is provided with a casing, a part at least of said connecting members penetrating into said rotary drum, and
   (b) a drive device for said at least one cutting element and said rotary drum comprising a shaft and a hub connected in rotation to said shaft and on which are fastened said at least one cutting element and said rotary drum,
   (c) said shaft and said hub extending at least partly into said rotary drum, while said part of said connecting members penetrating into said rotary drum is connected to said shaft, (d) said casing of said rotary drum being formed by a plurality of standards separated from one another by spaces and connected together at their lower parts by a lower connecting element and at their upper parts by an upper connecting element, and (e) the front edges of said plurality of standards, considering the direction of rotation of said rotary drum during use, being provided with removable protective pieces.

2. A mower according to claim 1 wherein:
(a) each one of said plurality of standards has at least approximately the same width;
(b) each one of said spaced between said plurality of standards has at least approximately the same width; and
(c) the width of said spaces is at least approximately equal to the width of said standards.

3. A mower according to claim 1 wherein said hub is one of said connecting elements.

4. A mower according to claim 3 wherein said hub is said lower connecting element.

5. A mower according to claim 1 wherein said upper connecting element forms a baffle with part of said connecting members penetrating into said rotary drum.

6. A mower according to claim 1 wherein said protective piece associated with each one of said plurality of standards surrounds the front edge of the associated one of said plurality of standards.

7. A mower according to claim 6 wherein at least one of said protective pieces comprises:
(a) an outside wing which covers at least the part of the outside face of the associated one of said plurality of standards located in the vicinity of said front edge and
(b) an inside wing which covers at least the part of said inside face of the associated one of said plurality of standards located in the vicinity of said front edge.

8. A mower according to claim 7 wherein said inside wing of said at least one of said protective pieces assumes at least approximately the shape of the part of the inside face of the associated one of said plurality of standards which it covers.

9. A mower according to claim 1 and further comprising fastening elements which fastens said protective piece on the associated one of said plurality of standards, said fastening elements being housed in a setback of said protective piece and being protected by the front edge of said protective piece.

10. A mower comprising:
(a) a frame supporting, by means of connecting members, at least one rotary cutting element provided with cutting tools and surmounted by a rotary drum which is provided with a casing, a part at least of said connecting members penetrating into said rotary drum, and
(b) a drive device for said at least one cutting element and said rotary drum comprising a shaft and a hub connected in rotation to said shaft and on which are fastened said at least one cutting element and said rotary drum,
(c) said shaft and said hub extending at least partly into said rotary drum, while said part of said connecting members penetrating into said rotary drum is connected to said shaft,
(d) said casing of said rotary drum being formed by a plurality of standards separated from one another by spaces and connected together at their lower parts by a lower connecting element and at their upper parts by an upper connecting element, and
(e) at least one of said plurality of standards being provided with a removable driver.

11. A mower according to claim 10 wherein:
(a) protective pieces associated with each one of said plurality of standards surround the front edge of the associated one of said plurality of standards and
(b) said removable driver and the associated one of said protective pieces are integral.

12. A mower according to claim 10 wherein:
(a) said outside face of said one of said plurality of standards has a groove extending parallel to the longitudinal axis of said one of said plurality of standards, and
(b) said drive is partly housed in said groove.

13. A mower according to claim 10 wherein said front face of said removable driver is directed obliquely toward the back, considering the direction or rotation of said rotary drum during use.

14. A mower according to claim 10 and further comprising fastening elements which fasten said removable driver on the associated one of said plurality of standards, said fastening elements being housed in a setback of said removable driver and being protected by the front face of said removable driver.

15. A mower according to claim 10 wherein said removable driver is at least approximately symmetrical in relation to the plane containing the axis of rotation of said rotary drum and the longitudinal axis of said one of said plurality of standards.

16. A mower comprising:
(a) a frame supporting, by means of connecting members, at least one rotary cutting element provided with cutting tools and surmounted by a rotary drum which is provided with a casing, a part at least of said connecting members penetrating into said rotary drum, and
(b) a drive device for said at least one cutting element and said rotary drum comprising a shaft and a hub connected in rotation to said shaft and on which are fastened said at least one cutting element and said rotary drum,
(c) said shaft and said hub extending at least partly into said rotary drum, while said part of said connecting members penetrating into said rotary drum is connected to said shaft,
(d) said casing of said rotary drum being formed by a plurality of standards separated from one another by spaces and connected together at their lower parts by a lower connecting element and at their upper parts by an upper connecting element, and
(e) the front edge of at least one of said plurality of standards being thicker than the central part of said one of said plurality of standards.

17. A mower according to claim 16 wherein at least one of said plurality of standards is at least approximately symmetrical in relation to the plane containing the axis of rotation of said rotary drum and the longitudinal axis of said at least one of said plurality of standards.

18. A mower according to claim 16 wherein at least one of said cutting elements comprises at least two segments which are removably fastened to said lower connecting element of said rotary drum.

19. A mower comprising:
(a) a frame adapted during use of said mower to be coupled to a tractor vehicle;
(b) connecting members;
(c) a cutting bar having rotary cutting elements and a rotary drum, said rotary cutting elements and said rotary drum being rotatably mounted on a housing, said rotary drum extending in parts at least above said rotary cutting elements and having an outer casing, an upper part and a lower part, said cutting bar being supported by said frame by means of said connecting members to cut crop material, said connecting members penetrating into said rotary drum by passing through said upper part of said rotary drum and forming a baffle with said upper part of said rotary drum;
(d) a drive device for driving in rotation said rotary cutting elements and said rotary drum, said drive device extending at least partially in said housing; and
(e) said outer casing of said rotary drum being formed by a plurality of standards separated from one another by spaces and having each one a lower and an upper end, said standards being connected together at their lower ends by said lower part and at their upper ends by said upper part.

20. The mower according to claim 19 wherein:
(a) each one of said plurality of standards has at least approximately the same width;
(b) each one of said spaces between said plurality of standards has at least approximately the same width; and
(c) the width of said spaces is at least approximately equal to the width of said standards.

21. The mower according to claim 19 wherein:
(a) each one of said plurality of standards has an inside face;
(b) the inside face of each one of said plurality of standards has a convex surface; and
(c) the center of a circumscribed circle to said convex surface is located outside the outer casing of said rotary drum.

22. The mower according to claim 21 wherein said convex surface is a curved convex surface.

23. The mower according to claim 19 wherein:
(a) said drive device comprises a shaft extending in said drum and
(b) said lower part of said drum is formed by a hub connected in rotation to said shaft.

24. The mower according to claim 23 wherein:
(a) at least one of said rotary cutting elements comprises two segments and
(b) said two segments are removably fastened to said hub of said drum.

25. The mower according to claim 19 wherein:
(a) each one of said standards has, considering during use a direction of rotation of said rotary drum, a front edge and
(b) said front edge is provided with a removable protective piece.

26. The mower according to claim 25 wherein:
(a) said protective piece has a front edge when considering a direction of rotation of said rotary drum during use and a setback and
(b) fastening element fasten said protective piece on the associated one of said standards, said fastening elements being housed in said setback and being protected by said front edge.

27. The mower according to claim 25 wherein each one of said protective pieces surrounds the front edge of the associated one of said standards.

28. The mower according to claim 27 wherein:
(a) each one of said protective pieces comprises an outside wing and an inside wing;
(b) each one of said standards has an outside face and an inside face;
(c) said outside wing of each one of said protective pieces covers at least the part of the outside face of the associated one of said standards located in the vicinity of the front edge of said associated one of said standards;
(d) said inside wing of each one of said protective pieces covers at least the part of the inside face of the associated one of said standards located in the vicinity of the front edge of said associated one of said standards; and
(e) said inside wing assumes at least approximately the shape of the part of the inside face of the associated one of said standards covered by said inside wing.

29. The mower according to claim 19 wherein each one of said plurality of standards is provided with a driver.

30. The mower according to claim 29 wherein:
(a) each one of said plurality of standards has an outside face and a longitudinal axis;
(b) said outside face has a groove extending parallel to said longitudinal axis; and
(c) said driver is partly housed in said groove.

31. The mower according to claim 29 wherein:
(a) said driver has a front face when considering a direction of rotation of said rotary drum use and
(b) said front face is directed obliquely backwardly, when considering said direction of rotation.

32. The mower according to claim 29 wherein:
(a) said driver has a front face, when considering a direction of rotation of said rotary drum during use and a setback, and
(b) fastening elements fasten said driver on the associated one of said standards, said fastening elements being housed in said setback and being protected by said front face.

33. The mower according to claim 29 wherein:
(a) each one of said standards has, considering during use a direction of rotation of said rotary drum, a front edge;
(b) said front edge is provided with a removable protective piece; and
(c) said protective piece and said driver are integral.

34. The mower according to claim 19 wherein:
(a) each one of said standards has a central part and, considering during use a direction of rotation of said rotary drum, a front edge and
(b) said front edge is thicker than said central part.

35. The mower according to claim 19 wherein said rotary drum extends near an end of said housing.

36. A mower comprising:
(a) a frame adapted during use of said mower to be coupled to a tractor vehicle;
(b) connecting members;
(c) a cutting bar having rotary cutting elements and two rotary drums, said rotary cutting elements and said two rotary drums being rotatably mounted on a housing, said two rotary drums extending in part at least above said rotary cutting elements and each one of said two rotary drums having an outer casing, an upper part and a lower part, said cutting bar being supported by said frame by means of said connecting members to cut crop material, said connecting members penetrating into each one of said two rotary drums by passing through said upper part of each of said two rotary drums and forming a baffle with said upper part of each one of said two rotary drums;

(d) a drive device for driving in rotation said rotary cutting elements and said two rotary drums, said drive device extending at least partially in said housing and comprising a shaft extending in at least one of said two drums; and (e) said outer casing of each one of said two rotary drums being formed by a plurality of standards separated from one another by spaces and having each one a lower and an upper end, said standards being connected together at their lower ends by said lower part of the associated one of said two rotary drums and at their upper ends by said upper part of the associated one of said two rotary drums.

37. The mower according to claim 36 wherein:
(a) each one of said plurality of standards has at least approximately the same width;
(b) each one of said spaced between said plurality of standards has at least approximately the same width; and
(c) the width of said spaces is at least approximately equal to the width of said standards.

38. The mover according to claim 36 wherein:
(a) each one of said plurality of standards has an inside face;
(b) the inside face of each one of said plurality of standards has a convex surface; and
(c) the center of a circumscribed circle to said convex surface is located outside the outer casing of the associated one of said two rotary drums.

39. The mower according to claim 38 wherein said convex surface is a curved convex surface.

40. The mower according to claim 36 wherein;
(a) said drive device comprises a shaft extending in each one of said two rotary drums and
(b) said lower part of each one of said two drums is formed by a hub connected in rotation to said associated shaft.

41. The mower according to claim 40 wherein:
(a) each one of said two drums extends above an associated one of said rotary cutting elements;
(b) each one of said associated one of said rotary cutting elements comprises two segments; and
(c) said two segments are removably fastened to said hub of the associated one of said two rotary drums.

42. The mower according to claim 36 wherein:
(a) said two rotary drums are counterrotating and
(b) each one of said two rotary drums extends near an end of said housing.

43. The mower according to claim 36 wherein;
(a) each one of said standards has, considering during use a direction of rotation of said associated one of said two rotary drums, a front edge and
(b) said front edge is provided with a removable protective piece.

44. The mower according to claim 43 wherein:
(a) said protective piece has a front edge when considering a direction of rotation of said associated one of said two rotary drums during use and a setback and (b) fastening elements fasten said protective piece on the associated one of said standards, said fastening elements being housed in said setback and being protected by said front edge.

45. The mower according to claim 43 wherein each one of said protective pieces surrounds the front edge of the associated one of said standards.

46. The mower according to claim 45 wherein:
(a) each one of said protective pieces comprises an outside wing and an inside wing;
(b) each one of said standards has an outside face and an inside face;
(c) said outside wing of each one of said protective pieces covers at least the part of the outside face of the associated one of said standards located in the vicinity of the front edge of said associated one of said standards;
(d) said inside wing of each one of said protective pieces covers at least the part of inside face of the associated one of said standards located in the vicinity of the front edge of said associated one of said standards; and
(e) said inside wing assumes at least approximately the shape of the part of the inside face of the associated one of said standards covered by said inside wing.

47. The mower according to claim 36 wherein each one of said plurality of standards is provided with a driver.

48. The mower according to claim 47 wherein:
(a) each one of said pluraltiy of standards has an outside face and a longitudinal axis;
(b) said outside face as a groove extending parallel to said longitudinal axis and
(c) said driver is partly housed in said groove.

49. The mower according to claim 47 wherein:
(a) said driver has a front face when considering a direction of rotation of said associated one of said two rotary drums during use and
(b) said front face is directed obliquely backwardly, when considering said direction of rotation.

50. The mower according to claim 47 wherein:
(a) said driver has a front face when considering a direction of rotation of said associated one of said two rotary drums during use and a setback and
(b) fastening elements fasten said driver on the associated one of said standards, said fastening elements being housed in said setback and being protected by said front face.

51. The mower according to claim 47 wherein:
(a) each one of said standards has, considering during use a direction of rotation of said associated one of said two rotary drums, a front edge;
(b) said front edge is provided with a removable protective piece; and
(c) said protective piece and said driver are integral.

52. The mower according to claim 47 wherein:
(a) each one of said two rotary drums has an axis of rotation;
(b) each one of said standards has a longitudinal axis;
(c) each one of said standards is at least approximately symmetrical in relation to a plane containing the axis of rotation of the corresponding one of said two rotary drums and its longitudinal axis; and
(d) each one of said driver is at least approximately symmetrical in relation to a plane containing the axis of rotation of the corresponding one of said two rotary drums and the longitudinal axis of the associated one of said standards.

53. The mower according to claim 36 wherein:
(a) each one of said standards has a central part and, considering during use a direction of rotation of said associated one of said two rotary drums, a front edge and
(b) said front edge is thicker than said central part.

54. In a cutting unit having rotary cutting elements and a rotary drum, said rotary cutting elements and said rotary drum being rotatably mounted on a housing containing drive means for transferring rotational power to said rotary cutting elements and said rotary drum from a source of rotational power, said rotary drum extending in part at least above said rotary cutting elements and having an outer casing, an upper part and a lower part, said cutting unit further comprising connecting members in order to be supported by a frame of a mower, said connecting members penetrating into said rotary drum by passing through said upper part of said rotary drum and forming a baffle with said upper part of said rotary drum, an improved rotary drum comprising an outer casing which is formed by a plurality of standards separated from one another by spaces and having each one a lower and an upper end, said standards being connected together at their lower ends by said lower part and at their upper ends by said upper part.

55. The cutting unit according to claim 54 wherein:
(a) at least one of said rotary cutting elements comprises two segments and
(b) said two segments are removably fastened to said lower part of said rotary drum.

56. The cutting unit according to claim 54 wherein:
(a) each one of said standards has, considering during use a direction of rotation of said rotary drum, a front edge and
(b) said front edge is provided with a removable protective piece.

57. The cutting unit according to claim 54 wherein each one of said standards is provided with a driver.

58. The cutting unit according to claim 57 wherein:
(a) each one of said standards has, considering during use a direction of rotation of said rotary drum, a front edge,
(b) said front edge is provided with a removable protective piece; and
(c) said protective piece and said driver are integral.

59. The cutting unit according to claim 54 wherein said rotary drum extends near an end of said housing.

60. In a cutter unit having rotary cutting elements and a two rotary drums, said rotary cutting elements and said two rotary drums being rotatably mounted on a housing containing drive means for transferring rotational power to said rotary cutting elements and said two rotary drums from a source of rotational power, said two rotary drums extending in part at least above said rotary cutting elements and each one of said two rotary drums having an outer casing, an upper part and a lower part, said cutting unit further comprising connecting members in order to be supported by a frame of a mower said connecting members penetrating into each one of said two rotary drums by passing through said upper part of each one of said two rotary drums and forming a baffle with said upper part of each one of said two rotary drums, an improved rotary drum comprising an outer casing which is formed by a plurality of standards separated from one another by spaces and having each one a lower and an upper end, said standards being connected together at their lower ends by said lower part and at their upper ends by said upper part.

61. The cutting unit according to claim 60 wherein:
(a) each one of said two rotary drums extends above an associated one of said rotary cutting elements;
(b) each one of said associated one of said rotary cutting elements comprises two segments; and
(c) said two segments are removably fastened to said lower part of the associated one of said two rotary drums.

62. The cutting unit according to claim 60 wherein:
(a) each one of said standards has, considering during use a direction of rotation of said associated one of said two rotary drums, a front edge and
(b) said front edge is provided with a removable protective piece.

63. The cutting unit according to claim 60 wherein each one of said plurality of standards is provided with a driver.

64. The cutting unit according to claim 60 wherein:
(a) each one of said standards has, considering during use a direction of rotation of said associated one of said two rotary drums, a front edge;
(b) said front edge is provided with a removable protective piece; and
(c) said protective piece and said driver are integral.

65. The cutting unit according to claim 63 wherein:
(a) each one of said two rotary drums has an axis of rotation;
(b) each one of said standards has a longitudinal axis;
(c) each one of said standards is at least approximately symmetrical in relation to a plane containing the axis of rotation of the corresponding one of said two rotary drums and its longitudinal axis; and
(d) each one of said driver is at least approximately symmetrical in relation to a plane containing the axis of rotation of the corresponding one of said two rotary drums and the longitudinal axis of the associated one of said standards.

66. The cutting unit according to claim 60 wherein:
(a) said two rotary drums are counterrotating and
(b) each one of said two rotary drums extends near an end of said housing.

* * * * *

UNITED STATES PATENT AND TRADEMARK OFFICE
CERTIFICATE OF CORRECTION

PATENT NO. : 4,809,488
DATED : MARCH 7, 1989
INVENTOR(S) : HORST NEUERBURG and JEAN-MARC JURGENS It is certified that error appears in the above-identified patent and that said Letters Patent is hereby corrected as shown below:

In column 9, line 15, delete "spaced" and insert --spaces--;

In column 10, line 22, delete "or" and insert --of--;

In column 11, line 8, delete "parts" and insert --part--;

In column 11, line 65, delete "element" and insert --elements--;

In column 12, line 34, delete "drum use" and insert --drum during use--;

In column 13, line 25, delete "spaced" and insert --spaces--;

In column 14, line 19, delete "of inside" and insert --of the inside--;

In column 14, line 33, delete "as" and insert --has--;

In column 15, line 51, delete "a".

Signed and Sealed this

Twenty-seventh Day of February, 1990

*Attest:*

JEFFREY M. SAMUELS

*Attesting Officer*     *Acting Commissioner of Patents and Trademarks*